United States Patent
McDonald

(10) Patent No.: US 11,767,233 B2
(45) Date of Patent: Sep. 26, 2023

(54) SYSTEM AND METHOD FOR GROUNDWATER REMEDIATION

(71) Applicant: HDR, Inc., Omaha, NE (US)

(72) Inventor: Shane D. McDonald, Malvern, PA (US)

(73) Assignee: HDR, Inc., Omaha, NE (US)

( * ) Notice: Subject to any disclaimer, the term of this patent is extended or adjusted under 35 U.S.C. 154(b) by 0 days.

(21) Appl. No.: 17/664,084

(22) Filed: May 19, 2022

(65) Prior Publication Data

US 2022/0371917 A1    Nov. 24, 2022

Related U.S. Application Data

(60) Provisional application No. 63/229,812, filed on Aug. 5, 2021, provisional application No. 63/190,337, filed on May 19, 2021.

(51) Int. Cl.

| | |
|---|---|
| *C02F 1/08* | (2023.01) |
| *C02F 1/04* | (2023.01) |
| *B01D 1/24* | (2006.01) |
| *B01D 1/00* | (2006.01) |
| *B09C 1/00* | (2006.01) |
| *C02F 103/06* | (2006.01) |

(52) U.S. Cl.
CPC .............. *C02F 1/08* (2013.01); *B01D 1/0023* (2013.01); *B01D 1/24* (2013.01); *B09C 1/002* (2013.01); *C02F 1/048* (2013.01); *C02F 2103/06* (2013.01)

(58) Field of Classification Search
CPC ........ C02F 1/048; C02F 1/08; C02F 2103/06; B01D 1/0023; B01D 1/24; B09C 1/002
See application file for complete search history.

(56) References Cited

U.S. PATENT DOCUMENTS

| | | | | |
|---|---|---|---|---|
| 4,585,523 A | * | 4/1986 | Giddings | B01D 1/22 165/133 |
| 4,882,071 A | * | 11/1989 | Bench | E21B 43/00 210/170.07 |
| 5,897,778 A | * | 4/1999 | Ishimori | C02F 1/28 210/691 |
| 6,258,273 B1 | * | 7/2001 | Gee | B09C 1/002 210/170.07 |
| 6,663,750 B1 | * | 12/2003 | Coon | C02F 1/14 202/202 |
| 7,166,188 B2 | * | 1/2007 | Kedem | C02F 1/047 159/48.2 |

(Continued)

*Primary Examiner* — Jonathan Miller

(74) *Attorney, Agent, or Firm* — AVEK IP, LLC; Mark C. Young

(57) ABSTRACT

A groundwater remediation system includes a capillary media supported and positioned such that it is partially submerged into a groundwater source to be remediated. Groundwater is drawn into the submerged portion of the capillary media and further into the non-submerged portion of the capillary material via natural capillary action. As the water evaporates from the non-submerged portion of the capillary media, the dissolved solids within the water precipitate onto the media leaving the precipitated solids for reclamation or disposal and allowing the cleaned water vapor to disperse into the ambient air. In some embodiments, heat may be added to the media, water, or air to accelerate the evaporative process.

14 Claims, 5 Drawing Sheets

(56) References Cited

U.S. PATENT DOCUMENTS

| | | | | |
|---|---|---|---|---|
| 7,815,776 B2* | 10/2010 | Wilson | ................... | B01D 1/30 |
| | | | | 202/202 |
| 9,770,672 B2* | 9/2017 | Peever | ...................... | C02F 1/04 |
| 2014/0209450 A1* | 7/2014 | Peever | ................... | B01D 5/006 |
| | | | | 405/36 |
| 2017/0252667 A1* | 9/2017 | Simpson | ................... | B01B 1/00 |

* cited by examiner

SYSTEM AND METHOD FOR GROUNDWATER REMEDIATION

CROSS-REFERENCE TO RELATED APPLICATIONS

This application claims the benefit of U.S. Provisional Patent Application No. 63/190,337, filed on May 19, 2021, and of U.S. Provisional Patent Application No. 63/229,812, filed on Aug. 5, 2021, the disclosure of each of which is hereby incorporated herein in its entirety by reference.

BACKGROUND

Environmental contaminants are on ongoing problem in industrialized nations. To avoid ground and water contamination, waste products from the mining of materials and from the production and processing of materials must be captured and disposed of. When such materials and waste products are not initially captured and disposed of, they are often stored in pits, mines, or on open ground, allowing potentially dangerous or undesirable chemicals and materials to leach into the ground and contaminate the underlying groundwater.

For example, coal ash produced in the burning of coal was often stored on the ground or in ponds surrounding an energy facility, allowing chemicals such as selenium, lithium, and arsenic to eventually seep into the groundwater under the storage site. Even if the storage site itself is eventually cleared, the contaminants in the ground and in the groundwater often remain for many years afterward.

Furthermore, strip mining and other mining methods, may disturb and expose previously buried contaminants that can then leach into the groundwater or surface water—a process sometimes referred to as "acid rock drainage" or ARD. The groundwater thus contains a high level of unwanted total dissolved solids (TDS), and is typically referred to as high TDS groundwater.

Because groundwater movement allows the chemicals to reach far beyond the original source, systems and methods for reclaiming source locations and remediating the groundwater been developed. For example, one known method requires pumping the groundwater to be remediated, such as from a well in the area of the contamination, into a treatment device comprising treatment technologies configured to remove specific contaminants, with the treated water returned to the ground or into a nearby stream or river. While generally effective in recovering some contaminants from groundwater, such operations require extensive equipment—pumps, pipes, filters, electrical stations, etc. —and are intrusive, expensive, and laborious to operate.

Thus, it can be seen that there remains a need in the art for alternative systems and methods for water remediation without the expense, equipment, and labor requirements of known systems and methods.

SUMMARY

Embodiments of the invention are defined by the claims below, not this summary. A high-level overview of various aspects of the invention is provided here to introduce a selection of concepts that are further described in the detailed description section below. This summary is not intended to identify key features or essential features of the claimed subject matter, nor is it intended to be used in isolation to determine the scope of the claimed subject matter. In brief, this disclosure describes systems and methods for groundwater remediation.

In one embodiment, a groundwater remediation system comprises a capillary media supported and positioned such that it is partially submerged into a pool of water to be remediated. The water may be groundwater (i.e., water below the underground water table) accessed through a well or pit in the ground, or may be water contained in a pit, hole, or other containment instrument or vessel.

With the capillary material thus positioned, contaminated (i.e., high TDS) groundwater is drawn into the submerged portion of the capillary media and further into the non-submerged portion of the capillary material via natural capillary action. As the water evaporates from the non-submerged portion of the capillary media, the dissolved solids within the water precipitate on the media as their solubility is exceeded in the evaporating water. Thus, the dissolved solids within the groundwater are drawn into the capillary media and deposited onto the capillary media as the water (minus the undesired contaminants) evaporates into the ambient air.

In further embodiments a heat source may be applied to the system, such as to the air, capillary media, and/or the groundwater to accelerate the subsequent evaporation of the water once drawn into the capillary media. In still further embodiments a fan may be used to accelerate the evaporation of the water from the non-submerged portion of the capillary media. In other embodiments, heat may be applied via a microwave heating means.

The capillary media is preferably supported by a support structure allowing the media to be placed in a desired position, and is replaced periodically, with the spent media disposed of and/or processed to reclaim metals, minerals, elements, or other precipitated materials from the media before disposal. For example, selenium, lithium, or other materials may be captured and reused in other applications.

Thus, In one aspect, the system and method of the present invention remove contaminants from groundwater or other contained water source. In another aspect, the precipitated materials on the capillary media may be reclaimed and reused from the spent media.

DESCRIPTION OF THE DRAWINGS

Illustrative embodiments of the invention are described in detail below with reference to the attached drawing figures, and wherein.

DETAILED DESCRIPTION

The subject matter of select embodiments of the invention is described with specificity herein to meet statutory requirements. But the description itself is not intended to necessarily limit the scope of claims. Rather, the claimed subject matter might be embodied in other ways to include different components, steps, or combinations thereof similar to the ones described in this document, in conjunction with other present or future technologies. Terms should not be interpreted as implying any particular order among or between various steps herein disclosed unless and except when the order of individual steps is explicitly described. The terms "about" or "approximately" as used herein denote deviations from the exact value in the form of changes or deviations that are insignificant to the function.

Embodiments of the invention include systems and methods for groundwater remediation. Various embodiments employ various components, features, and methods for removing contaminants from a water source using a capillary material.

Figure 1:
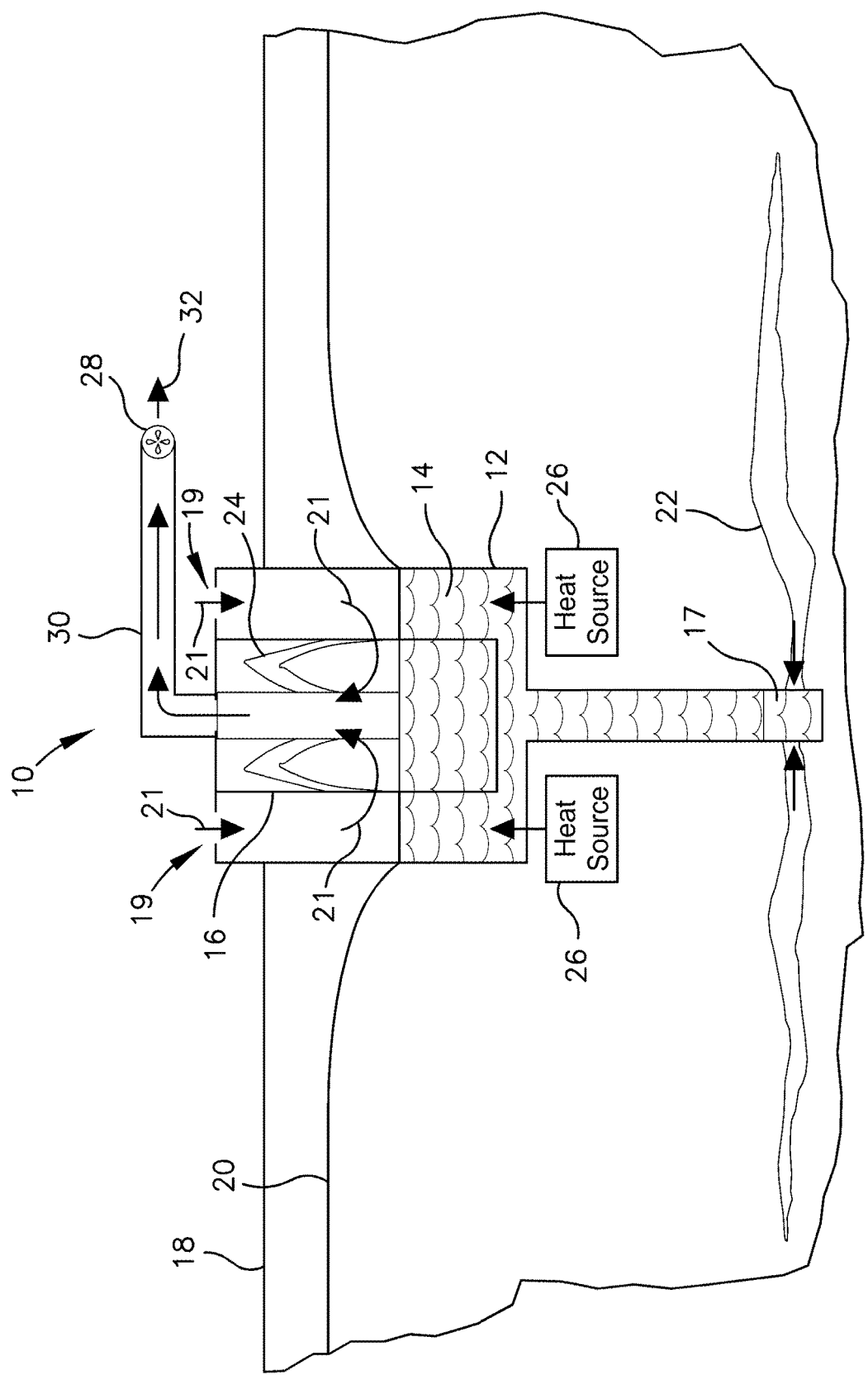
FIG. 1 is a diagrammatic view of a groundwater remediation system in accordance with an exemplary embodiment of the present invention.

Looking first to FIG. 1, a system for groundwater remediation in accordance with an exemplary embodiment of the present invention is depicted generally by the numeral 10. The groundwater remediation system 10 comprises a well 12 containing captured groundwater 14 needing remediation, namely groundwater having contaminants or other unwanted dissolved materials brought into the well 12 through well opening 17. A capillary media 16 is positioned partially submerged in the captured groundwater 14 within the well 12. As will be described in more detail below, the capillary media 16 is preferably supported by a structure, such as a frame, that positions the capillary media in a desired position within the well. The capillary media may be any type of media operable to draw in water via capillary action such a fibrous material, or any other natural or synthetic material.

Captured groundwater 14 originates from an underground water supply, i.e., the water table and aquifer 20 present under much of the earth's ground surface, with well 12 including an opening or pit 17 tapping through the earth into the aquifer 20. Alternatively, well 12 may include any other passage allowing groundwater 14 into the well 12. High TDS groundwater 22 may enter the aquifer 20 through any mechanism, such as through percolation from the ground surface 18.

Well 12 may be any type of well, vessel, container, opening or void as known in the art that allows access to captured groundwater 14. For example, in one embodiment well 12 may comprise a liner encircling a hole dug or bored into the ground surface 18.

The capillary media 16 is preferably positioned and supported in the well 12 by a support structure such as a frame, beam, truss, or the like that positions and supports the capillary media 16 in the desired partially submerged position. Most preferably, the support structure allows the capillary media 16 to be easily removed and replaced as required.

With the capillary media 16 thus positioned within the well 12, contaminated (i.e., high TDS) groundwater is drawn into the submerged portion of the media 16 and upwardly into the non-submerged portion of the media via natural capillary action. One or more openings 19 at the top of the well allow ambient air 21 to enter the well and circulate surround the media, allowing the water drawn into the media to evaporate. As the water evaporates from the non-submerged portion of the media 16, the dissolved solids within the water precipitate onto the media 16 as their solubility is exceeded in the evaporating water. Thus, the dissolved solids within the groundwater 14 are drawn into the capillary media and deposited onto the capillary media as the water (minus the undesired contaminants) evaporates into the ambient air.

Because the various materials and contaminants in the groundwater have different solubilities, those precipitated solid materials 24 are deposited across the capillary media 16 in a stratified arrangement, i.e., with less soluble materials generally being deposited lower on the capillary media 16 and more soluble materials generally being deposited higher on the capillary media 16. This stratification of the various materials permits easier extraction and reclamation of the materials from the capillary media 16 if desired. In conjunction with the materials being deposited onto the capillary media 16, the water formerly containing those materials is evaporated into the ambient air—minus those unwanted materials. Thus, the system as just described removes the contaminants from the groundwater and permits the now-cleaned water to evaporate into the air, without the use of any pumps or requiring any powered movement of the water.

It should be understood that while the exemplary embodiment of FIG. 1 shows use of the system in conjunction with groundwater 14 in a well 12, the system may likewise be used in conjunction with, for example, sludge water in a pit or hole near a mining site, or with water contained in an abandoned mine, without requiring a specific well 12 or liner configuration.

Looking still to FIG. 1, in further embodiments the well 12 may include one or more heat sources 26 operable to provide heat to the system 10, such as to the groundwater 14 within the well 12, to the capillary media 16, to the air drawn into the system 21, or combinations thereof, to accelerate the evaporative process. The heat source 26 may be a gas heater, electric heater, solar heater, microwave heater, or other type of heating element or generator known in the art. In further embodiments the system 10 may include a fan 28 operable to draw air across the capillary media 16 to accelerate the evaporative process. In this embodiment, an exhaust tube 30 directs the wet air out of the well and into the atmosphere. In further embodiments, the wet exhaust air 32 may be directed to a condensing unit that facilitates the conversion of the wet air back to clean liquid water, which may then be used or directed to a nearby stream or river.

Figure 2:
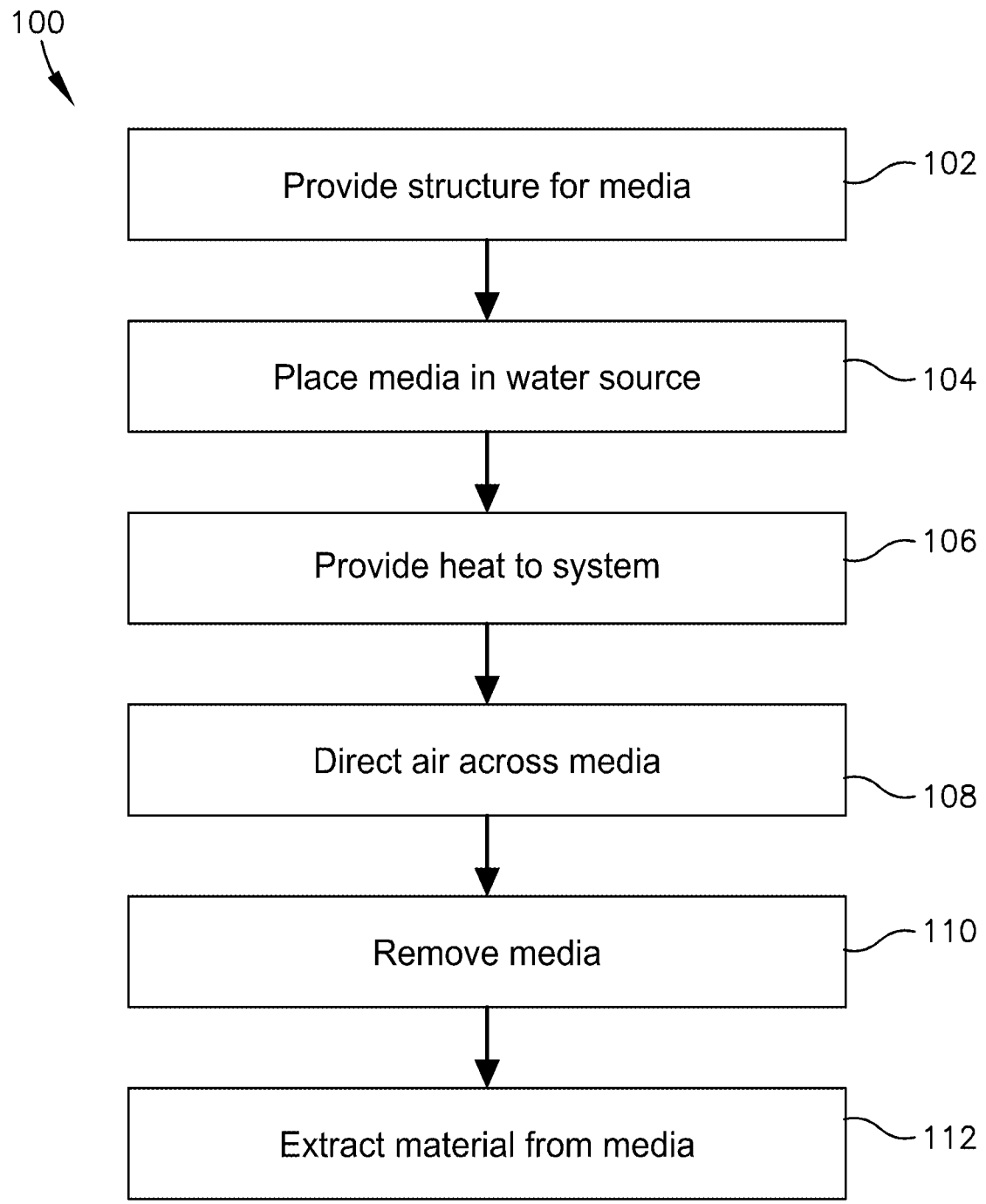
FIG. 2 is a flow diagram of a method of groundwater remediation in accordance with an exemplary embodiment of the present invention.

With the structure and general operation of the system 10 set forth, looking to FIG. 2, a method of remediating groundwater is depicted generally by the numeral 100. With reference back to FIG. 1, at block 102 a structure is provided for supporting and positioning a capillary media. At block 104, the media is placed onto the structure and positioned such that it is partially submerged into a water source from which contaminants are to be removed.

At block 106, a heat source provides heat to the system to accelerate the evaporation of the water once drawn into the capillary media. It should be understood that the heat source may heat the water, the capillary media, the air, or combinations of those. It should be further understood that in other embodiments that no external heat source may be applied.

At block 108, air is directed across the capillary media to accelerate the evaporation of water. As described above, as the water evaporates from the capillary media the solids within the water are precipitated to the capillary media.

At block 110, the capillary media is removed and replaced with new media to allow further removal of additional contaminants if necessary.

Finally, at block 112, the materials precipitated onto the capillary media are extracted from the media for reclamation, reuse, or disposal.

It should be understood that the steps as just described are exemplary, and that various combinations of the described steps are within the scope of the present invention. For example, in some embodiments, no heat may be applied to the system to accelerate the evaporation of the water from the capillary media. In other embodiments, the air may circulate naturally around the capillary media, with no fan or air mover to accelerate or direct the air flow. These and other embodiments are within the scope of the present invention.

Figure 3:
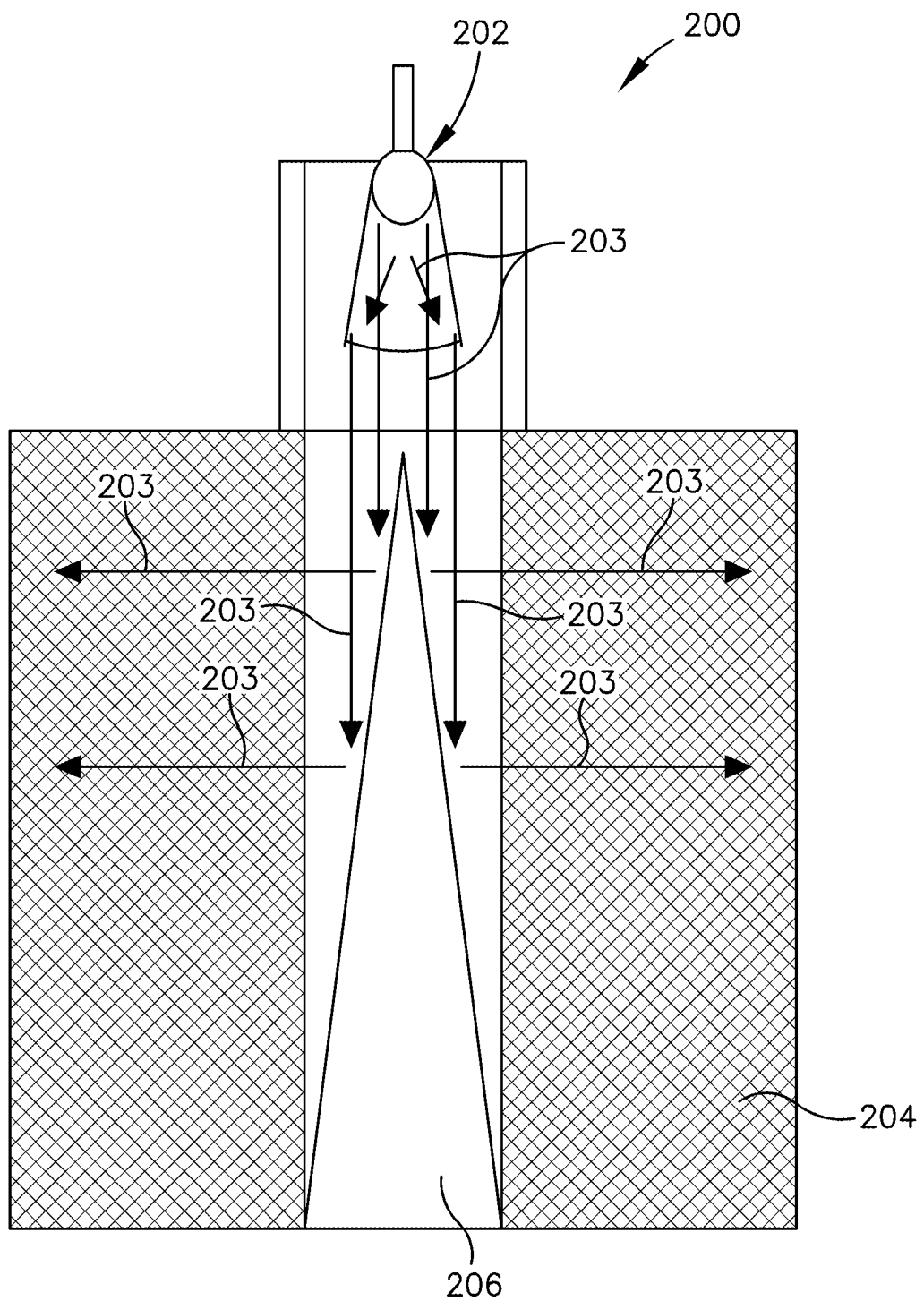
FIG. 3 is a diagrammatic view of a groundwater remediation system having microwave heating of capillary media in accordance with an exemplary embodiment of the present invention.

Turning to FIG. 3, an exemplary embodiment employing microwave heating of the capillary media is depicted generally by the numeral 200. Microwave heating provides an efficient way to add heat to the wicking well system to enhance evaporation. The system includes a magnetron microwave emitter 202 operable to emit microwaves 201. A downwardly facing parabolic focus reflector 203 directs the emitted microwaves downwardly towards the center of the capillary media 204. A conical reflector 206 positioned within, or surrounded by, the capillary media 204 reflects the downwardly directed microwaves outwardly and into the capillary media 204. Preferably, the frequency of the microwaves is tuned to cause the water molecules of the TDS water to vibrate, heating the water directly. In one embodiment, the magnetron microwave emitter is positioned within the downward-facing parabolic reflector, or connected to a downward aimed wave guide, in the exhaust line just above the capillary media. In other embodiments, the capillary media is seeded with materials that are also heated by microwaves to increase the efficiency of the microwave heating.

Figure 4:
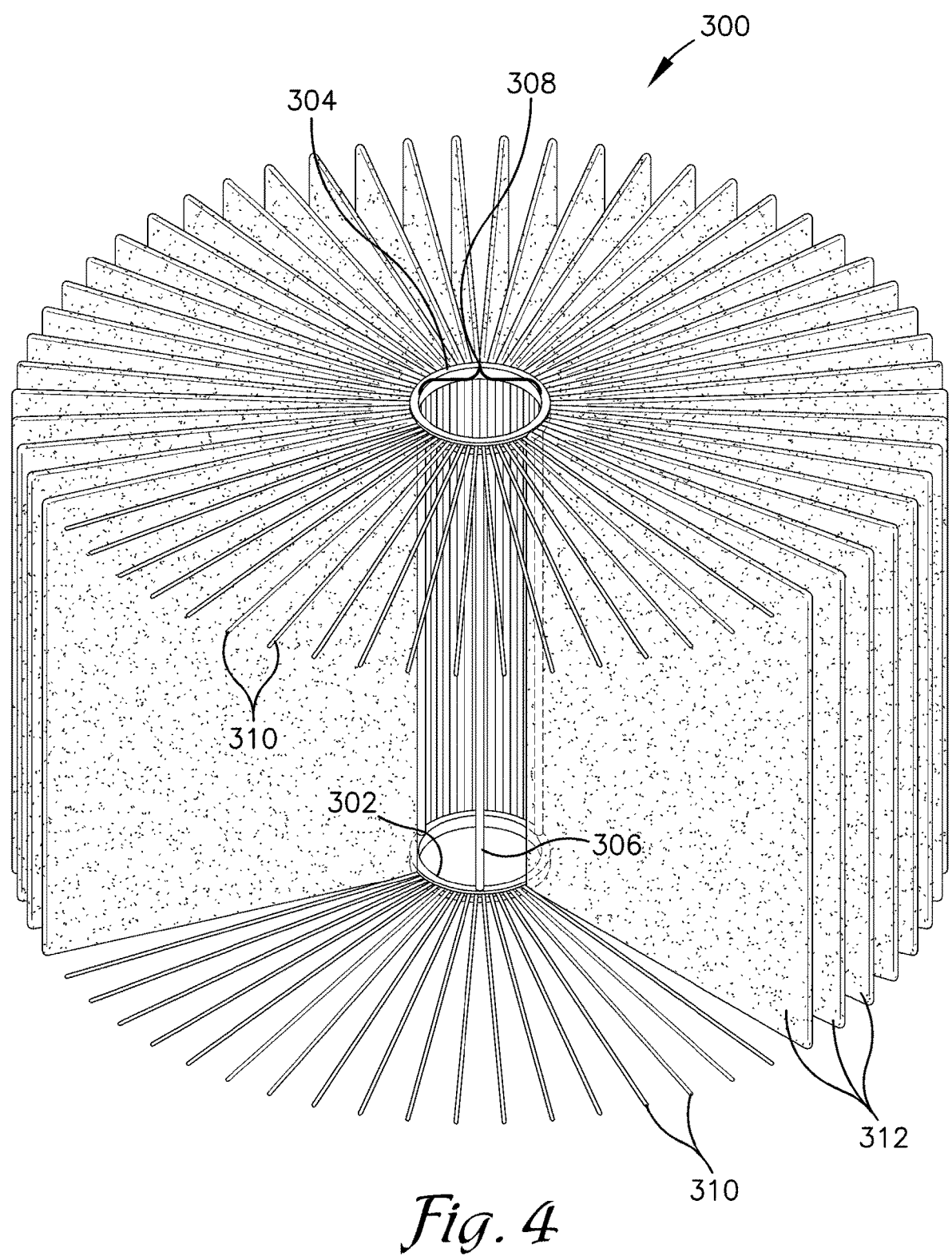
FIG. 4 is perspective view of a support structure and capillary media in accordance with an exemplary embodiment of the present invention.

Turning to FIG. 4, a capillary media and support structure for use in the system and method of the present invention is depicted generally as numeral 300. A center support structure comprises a lower ring 302 and an upper ring 304 connected by a plurality of vertical support rods 306. The center structure forms a cylindrical center section 308.

A series of horizontal support rods 310 extend outwardly like spokes from each of the lower ring 302 and the upper ring 304, with the upper and lower support rods aligned in pairs. A sheet or pocket of capillary media material 312 is attached over each pair of upper and lower support rods so that the material 312 is held vertically upright, extending between the upper and lower rods.

As can be seen in FIG. 4, with capillary media material attached to each spoked pair of support rods, there is space between each section of material to allow air flow to facilitate the evaporation of water from the media as previously described.

With reference back to FIG. 1, it can be seen that the support structure and capillary media of FIG. 4 may be placed partially submerged into the groundwater to be remediated (e.g., media 16 in FIG. 1). And, with reference to FIG. 3, it can be seen that the microwave heating of the capillary media as described with respect to that figure may be employed in conjunction with the support structure of FIG. 4.

It should be understood that the cylindrical shape and spoked arrangement of the capillary media and support structure are exemplary, and that other configurations of structure and media may be used in accordance with the present invention. For example, the capillary media may be configured as a single cylindrical cartridge, may be configured as multiple rectangular or square sections of media stacked in a cubical arrangement, or may be any other arrangement of media and support structure.

Figure 5:
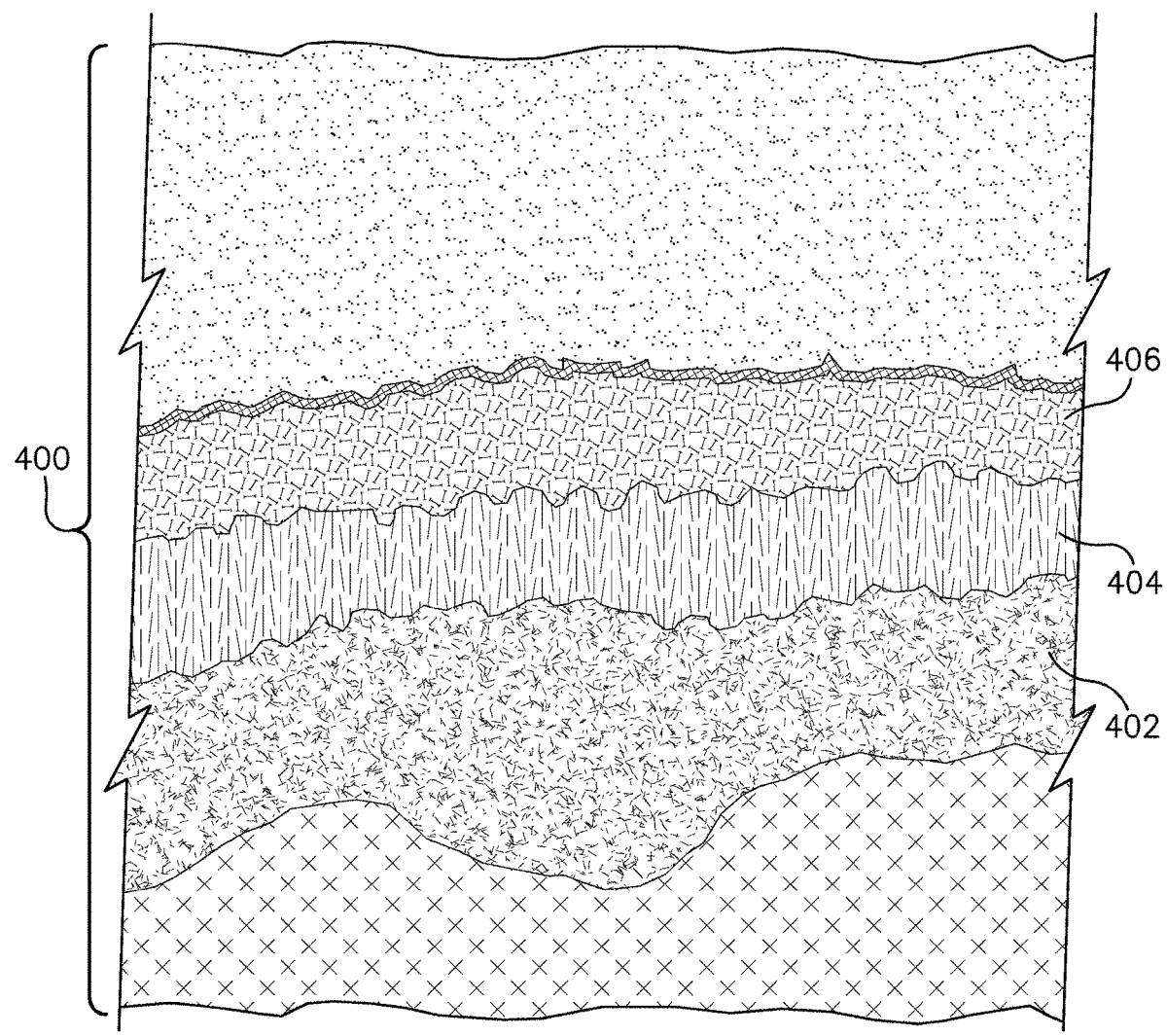
FIG. 5 is close-up partial view of a section of capillary media showing stratification of materials extracted from groundwater in accordance with an exemplary embodiment of the present invention.

With reference to FIG. 5, as described above, because the various materials and contaminants in the groundwater have different solubilities, the precipitated solid materials are deposited across the capillary media in a stratified arrangement, i.e., with less soluble materials generally being deposited lower on the capillary media and more soluble materials generally being deposited higher on the capillary media. As depicted in FIG. 5, on an exemplary section of capillary media 400, the various materials are stratified across the media in various bands, depicted as bands 402, 404, 406, etc. on the media, with each band comprising a particular material or element. The stratification of the various materials permits easier extraction and reclamation of the materials from the capillary media as previously described.

As can be seen, the system and method as just described are well adapted for removing contaminants from groundwater or other water sources using a capillary media, and without requiring the use of pumps or otherwise requiring movement of the water to be remediated.

While the system and method of the present invention have been described herein with respect to exemplary embodiments, it should be understood that other configurations and arrangements are within the scope of the present invention. Furthermore, many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Identification of structures as being configured to perform a particular function in this disclosure and in the claims below is intended to be inclusive of structures and arrangements or designs thereof that are within the scope of this disclosure and readily identifiable by one of skill in the art and that can perform the particular function in a similar way. Certain features and sub-combinations are of utility and may be employed without reference to other features and sub-combinations and are contemplated within the scope of the claims.

What is claimed is:

1. A system for groundwater remediation, comprising:
    a capillary media configured to absorb water and propagate the water from a first portion of the media to a second portion of the media via capillary action;
    a support structure for supporting the capillary media within a contaminated water source such that the capillary media is partially submerged and partially exposed so that contaminated water is drawn upwardly through the capillary media via capillary action to precipitate soluble materials from the contaminated water onto the capillary media upon evaporation of the water from the exposed portion of the capillary media;
    an air source permitting air to circulate around the capillary media to facilitate evaporation of water from the exposed portion of the capillary media; and
    a heat source operable to heat the capillary media, the contaminated water, the air, and combinations thereof, wherein the heat source comprises a microwave heater comprising a magnetron microwave emitter configured to generate microwaves.

2. The system of claim 1, wherein the capillary media is seeded with microwave conducive materials to enhance the heating of the capillary media by the generated microwaves.

3. The system of claim 1, further comprising a reflector positioned to reflect the generated microwaves toward the capillary media.

4. The system of claim 1, further comprising a fan configured to circulate air across the capillary media to enhance the evaporation of water from the exposed portion of the capillary media.

5. The system of claim 4, further comprising an exhaust tube in fluid communication with the fan to direct air drawn across the capillary media outwardly away from the contaminated water source.

6. The system of claim 1, wherein the support structure comprises a center open area and a series of outwardly extending spokes for supporting a plurality of capillary media panels.

7. A method for groundwater remediation, comprising:
supplying a capillary media configured to absorb water and propagate the water from a first portion of the media to a second portion of the media via capillary action;
positioning a support structure for supporting the capillary media within a contaminated water source such that the capillary media is partially submerged and partially exposed so that contaminated water is drawn upwardly through the capillary media via capillary action to precipitate soluble materials from the contaminated water onto the capillary media upon evaporation of the water from the exposed portion of the capillary media;
providing an air source permitting air to circulate around the capillary media to facilitate evaporation of water from the exposed portion of the capillary media; and
providing a heat source operable to heat the capillary media, the contaminated water, the air, and combinations thereof, wherein the heat source comprises a microwave heater comprising a magnetron microwave emitter configured to generate microwaves.

8. The method of claim 7, wherein the capillary media is seeded with microwave conducive materials to enhance the heating of the capillary media by the generated microwaves.

9. The method of claim 7, further comprising providing a reflector positioned to reflect the generated microwaves toward the capillary media.

10. The method of claim 7, further comprising providing a fan configured to circulate air across the capillary media to enhance the evaporation of water from the exposed portion of the capillary media.

11. The method of claim 7, further comprising removing the capillary media and extracting precipitated materials.

12. The method of claim 11, wherein the materials are identified and extracted based at least partially on their stratification arrangement on the removed capillary media.

13. The method of claim 11, further comprising replacing the removed capillary media with new capillary media.

14. The method of claim 7, wherein the support structure comprises a center open area and a series of outwardly extending spokes for supporting a plurality of capillary media panels.

* * * * *